United States Patent
Yamauchi et al.

(10) Patent No.: US 7,778,625 B2
(45) Date of Patent: Aug. 17, 2010

(54) PORTABLE WIRELESS TERMINAL APPARATUS AND METHOD FOR SENDING INFORMATION IN EMERGENCY

(75) Inventors: Osamu Yamauchi, Kawasaki (JP); Masahiro Harima, Kawasaki (JP); Atsushi Ito, Kawasaki (JP); Eriko Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 11/261,564

(22) Filed: Oct. 31, 2005

(65) Prior Publication Data

US 2007/0026889 A1    Feb. 1, 2007

(30) Foreign Application Priority Data

Jul. 27, 2005   (JP)  ............................. 2005-217488

(51) Int. Cl.
H04M 11/04   (2006.01)
(52) U.S. Cl. ................. 455/404.1; 455/414.1; 455/410; 379/45; 379/47; 340/292; 340/293
(58) Field of Classification Search .............. 455/404.1, 455/552.1, 424, 425, 550.1, 575.1, 456.5, 455/456.6, 561, 404.2, 410, 414.3, 334, 343.3, 455/414.1, 456.1, 456.3; 379/37, 41, 38, 379/39, 40, 33, 44, 47, 58, 59, 100, 49, 161, 379/45; 340/309.15, 531, 573.1, 521, 539, 340/517, 573, 539.26, 539.18, 539.17, 539.11, 340/539.1, 286.01, 286.06, 531.1, 309.1, 340/292, 293
See application file for complete search history.

(56) References Cited

U.S. PATENT DOCUMENTS 5,926,133 A *  7/1999  Green, Jr. ................... 342/363

| 6,285,867 B1 * | 9/2001 | Boling et al. ............ 455/404.1 |
| 6,542,759 B1 * | 4/2003 | Fujiki et al. .............. 455/575.1 |
| 6,587,739 B1 * | 7/2003 | Abrams et al. ................ 700/83 |
| 2001/0017912 A1 * | 8/2001 | Baum et al. .................... 379/37 |
| 2003/0034881 A1 * | 2/2003 | Linnett et al. .......... 340/309.15 |
| 2003/0036405 A1 * | 2/2003 | Hijii .......................... 455/552 |

(Continued)

FOREIGN PATENT DOCUMENTS

JP    07-170564 A    7/1995

(Continued)

OTHER PUBLICATIONS

"Japanese Office Action", mailed by JPO and corresponding to Japanese application No. 2005-217488 on Jun. 15, 2010, with English translation.

*Primary Examiner*—Duc Nguyen
*Assistant Examiner*—Charles Chow
(74) *Attorney, Agent, or Firm*—Fujitsu Patent Center (57) ABSTRACT

An operation-mode control unit controls switching of an operation mode of a portable wireless terminal apparatus between a normal mode and an alarm mode. An alarm-data sending unit sends data pertaining to a situation of a user to a predetermined destination as alarm data, when the operation mode is switched to the alarm mode. In the normal mode, the portable wireless terminal apparatus performs normal functions, such as a phone call and an e-mail. In the alarm mode, the portable wireless terminal apparatus performs a user protecting function in addition to the normal functions, such as sending the alarm data to the predetermined destination.

18 Claims, 4 Drawing Sheets

U.S. PATENT DOCUMENTS

| | | | |
|---|---|---|---|
| 2003/0143974 A1* | 7/2003 | Navarro | 455/404 |
| 2004/0029610 A1* | 2/2004 | Ihira et al. | 455/550.1 |
| 2004/0203769 A1* | 10/2004 | Sakanaba | 455/435.1 |
| 2005/0096008 A1* | 5/2005 | Shin | 455/404.1 |
| 2005/0197096 A1* | 9/2005 | Yang et al. | 455/404.1 |
| 2005/0239477 A1* | 10/2005 | Kim et al. | 455/456.1 |
| 2006/0178128 A1* | 8/2006 | Eaton et al. | 455/404.1 |
| 2007/0173225 A1* | 7/2007 | Aaron | 455/404.1 |

FOREIGN PATENT DOCUMENTS

| | | | |
|---|---|---|---|
| JP | HEI11-041669 A | | 2/1999 |
| JP | 11-205851 A | | 7/1999 |
| JP | 2001-307254 A | | 11/2001 |
| JP | 2002-223322 A | | 8/2002 |
| JP | 2002-247223 A | | 8/2002 |
| JP | 2003-169165 | * | 6/2003 |
| JP | 2003-187361 A | | 7/2003 |
| JP | 2004-007194 A | | 1/2004 |
| JP | 2004-038634 A | | 2/2004 |
| JP | 2004-040733 A | | 2/2004 |
| JP | 2004-072499 | * | 3/2004 |
| JP | 2004-072499 A | | 3/2004 |
| JP | 2004-134904 A | | 4/2004 |
| JP | 2005-026827 A | | 1/2005 |
| JP | 2006-270296 A | | 10/2006 |

* cited by examiner

FIG. 4

PORTABLE WIRELESS TERMINAL APPARATUS AND METHOD FOR SENDING INFORMATION IN EMERGENCY

BACKGROUND OF THE INVENTION

1. Field of the Invention

The present invention relates to a technology for sending information on a user in an emergency situation without any operation of the user.

2. Description of the Related Art

As a monitoring system using a cell phone, a monitoring system that controls and monitors a cell phone to be monitored from a monitoring center is disclosed in, for example, Japanese Patent Laid-Open Publication No. 2002-247223. This type of monitoring system links a plurality of monitoring modes corresponding to different degrees of emergencies to a schedule of monitoring period. With this configuration, the monitoring system sends various pieces of information required for ascertaining a situation, such as sound, images, and surrounding situation of the cell phone being monitored, to the monitoring center. Thus, a comprehensive monitoring system can be built, which enables to secure a safety of a user, and taking preservation of an evidence and a preemptive move in an emergency, for a variety of emergency situations.

However, the monitoring system described above is not so cost-effective, as it requires other installations apart from the cell phone. Besides, the operation of the monitoring system is complicated, as it requires prior selection of the monitoring mode and registration of monitoring request duration.

In response to the need for a simple monitoring system that can dispense with installations, such as a security device, and a monitoring center, a security system is disclosed in Japanese Patent Laid-Open Publication No. 2004-72499, in which a user can send information to a predetermined destination by pressing an emergency button on a wireless terminal apparatus.

The wireless terminal apparatus is equipped with a function of storing data pertaining to an emergency situation that arises when the apparatus is out of communication range and sending the stored data when the apparatus enters in the communication range again. Furthermore, even when the apparatus is switched off or in a stand-by mode, its security function is always on.

However, since the wireless terminal apparatus described above requires pressing of the emergency button, it is not very effective in some situations, such as abduction or illegal incarceration, where the user cannot access the wireless terminal apparatus.

SUMMARY OF THE INVENTION

It is an object of the present invention to at least solve the problems in the conventional technology.

A portable wireless terminal apparatus according to one aspect of the present invention includes an operation-mode control unit that controls switching of an operation mode of the portable wireless terminal between a normal mode and an alarm mode; and an alarm-data sending unit that sends data pertaining to a situation of a user to a predetermined destination as alarm data, when the operation mode is switched to the alarm mode. In the normal mode, the portable wireless terminal apparatus performs normal functions as a portable wireless communication terminal, such as a phone call and an e-mail. In the alarm mode, the portable wireless terminal apparatus performs a user protecting function in addition to the normal functions, such as sending the alarm data to the predetermined destination.

A method of securing a safety of a user of a portable wireless terminal apparatus, according to another aspect of the present invention, includes controlling switching an operation mode portable wireless terminal between a normal mode and an alarm mode; and first sending including sending data pertaining to a situation of a user to a predetermined destination as alarm data, when the operation mode is switched to the alarm mode. In the normal mode, the portable wireless terminal apparatus performs normal functions as a portable wireless communication terminal, such as a phone call and an e-mail. In the alarm mode, the portable wireless terminal apparatus performs a user protecting function in addition to the normal functions, such as sending the alarm data to the predetermined destination.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the embodiments described below, a cell phone used in a perilous situation is taken as an example of the portable wireless terminal apparatus according to the present embodiment.

Figure 1:
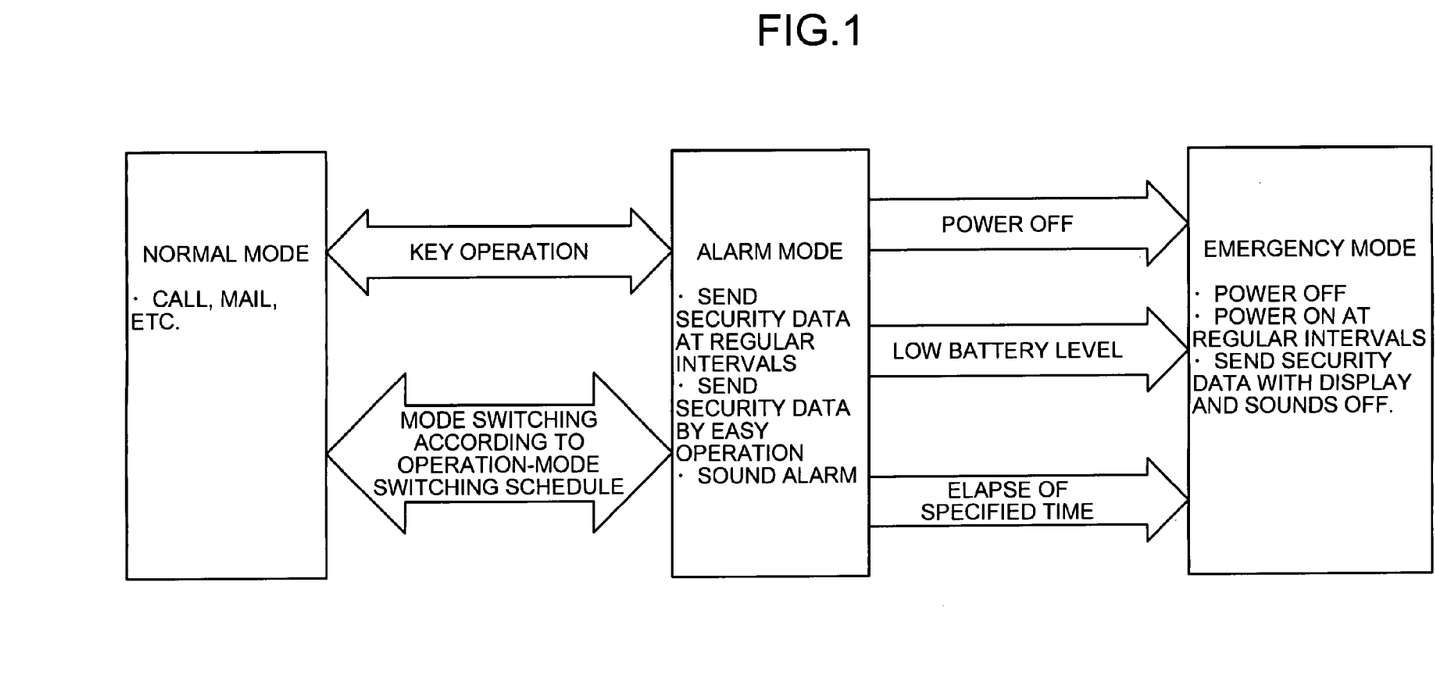
FIG. 1 is a schematic for illustrating three operation modes and transition states between the operation modes of a cell phone according to an embodiment of the present invention.

FIG. 1 is a schematic for illustrating three operation modes and transition states between the operation modes of a cell phone according to an embodiment of the present invention.

The operation modes include a normal mode, an alarm mode, and an emergency mode. The normal mode is used ordinarily for using a phone call or an e-mail, without using operations pertaining to security such as capturing and sending images, acquiring and sending location data, recording and sending sounds, and monitoring battery level, are carried out. The cell phone switches from the normal mode to the alarm mode upon a user operation or according to a schedule set by the user.

In the alarm mode, in addition to the function of the normal mode, a first stage of a security function is activated in which security data required for user safety is sent to a predetermined address by the e-mail. The security data include location data of the cell phone, images and sounds of the surroundings, etc. In the alarm mode, the user can operate the cell phone to promptly carry out security operations, such as capturing and dispatching images, acquiring and sending location data, recording and sending sounds, as well as sounding an alarm. The cell phone can also be programmed by the user to automatically capture and send images and location data as well as record and send sounds periodically at regular intervals preset by the user.

The cell phone switches from the alarm mode to the normal mode upon a user operation or according to the schedule set by the user.

If the cell phone is switched off in the alarm mode, the mode switches from the alarm mode to the emergency mode if the time set by the user elapses or if the battery level falls down below a threshold value set by the user.

In the emergency mode, a second stage of the security function is activated in which security data required for user safety is sent to the predetermined address by the e-mail. The cell phone is essentially switched off to all appearances but automatically switches itself on periodically at user-specified intervals, capturing and sending images and acquiring and sending location data as well as recording and sending sounds, with display off, not to be recognized by a third party.

Thus, by providing the three operation modes, with the inter-switching of the operation modes being enabled, a simple security system can be built that requires only that a cell phone is used in the alarm mode. Thus, the need for the functions of a monitoring center or other security functions is obviated.

When the security function is activated, the cell phone automatically and sends security data without requiring a user operation at regular intervals. Thus, even under potentially perilous situations like abduction or illegal incarceration, the security function can be activated imperceptibly without being recognized by the perpetrator, which otherwise might jeopardizes the user.

Figure 2:
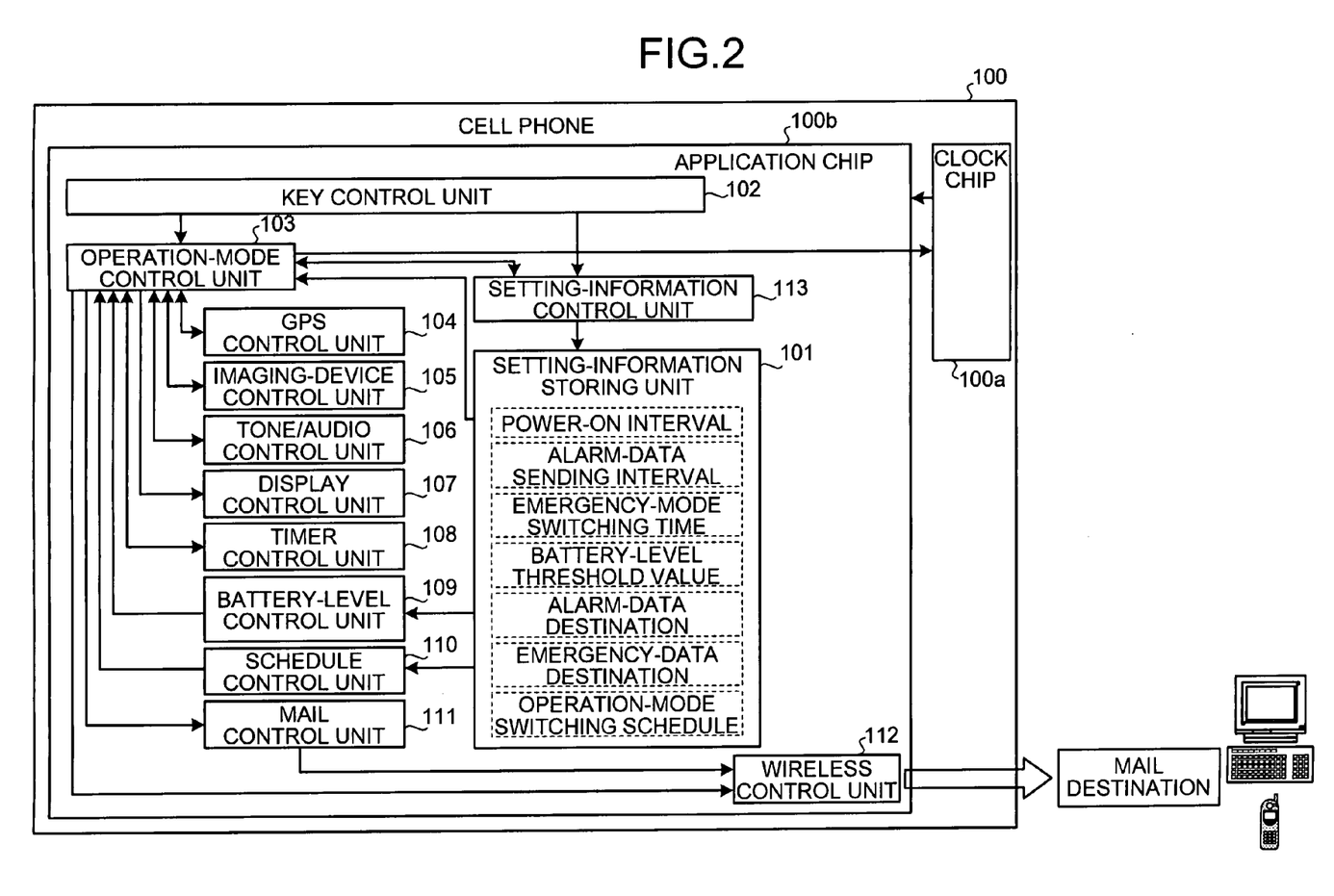
FIG. 2 is a block diagram of the cell phone according to the present embodiment.

FIG. 2 is a block diagram of a cell phone 100 according to the present embodiment. The cell phone 100 includes a clock chip 100*a* and an application chip 100*b*.

The clock chip 100*a* is a timer that is always powered on, even when the cell phone 100 is switched off. The clock chip 100*a* is used for setting the period upon elapse of which alarm data is to be sent when the cell phone is in the alarm mode. The clock chip 100*a* powers on the application chip 100*b* once the set time elapses.

The application chip 100*b* is a piece of hardware that enables the cell phone to function as a normal cell phone as well as a security device. The application chip 100*b* includes a setting-information storing unit 101, a key control unit 102, an operation-mode control unit 103, a GPS control unit 104, an imaging-device control unit 105, a tone/audio control unit 106, a display control unit 107, a timer control unit 108, a battery-level control unit 109, a schedule control unit 110, a mail control unit 111, a wireless control unit 112, and a setting-information control unit 113.

The setting-information storing unit 101 stores settings such as power-on period, alarm data sending period, the emergency mode switching time, battery-level threshold value, emergency data destination, operation mode switching schedule, etc.

The power-on period is a period in which the cell phone is switched on in the alarm mode and security data required for ascertaining the surroundings or the location is sent as emergency data. The emergency data destination is an e-mail address of the destination where the emergency data is to be sent. The alarm data sending period is a period in which security data is sent in the alarm mode. The alarm data destination is a mail address where the alarm data is to be sent. The emergency mode switching time is the time when the cell phone is to switch from the alarm mode to the emergency mode. The battery-level threshold value is a threshold value of a remaining power of the battery when the cell phone is to switch from the alarm mode to the emergency mode. The operation mode switching schedule is a schedule in which the duration after which the cell phone is to switch from the normal mode to the alarm mode is set. Incidentally, the setting-information storing unit 101 has a non-volatile memory.

The key control unit 102 accepts the key operations made by the user and conveys the content of the key operations to the operation-mode control unit 103 or the setting-information control unit 113. For instance, the key control unit 102 accepts the key operation made for switching the operation mode from the normal mode to the alarm mode and conveys it to the operation-mode control unit 103. Similarly, the key control unit 102 also receives settings to be stored in the setting-information storing unit 101 from the user and conveys them to the setting-information control unit 113.

The operation-mode control unit 103 controls the switching between the normal mode, the alarm mode, and the emergency mode and controls the operation during each operation mode. How the operation-mode control unit 103 controls the operation during each of the operation mode based on the operation mode of the cell phone 100, the key operation notification by the key control unit 102, the settings stored in the setting-information storing unit 101, etc, is explained in detail below.

When the cell phone 100 is in the normal mode, upon receiving a notification from the key control unit 102 that there has been a key operation by the user to switch from the normal mode to the alarm mode or from the schedule control unit 110 that it is time to switch from the normal mode to the alarm mode, the operation-mode control unit 103 switches the operation mode of the cell phone 100 from the normal mode to the alarm mode.

The operation-mode control unit 103 refers to the alarm data stored in the setting-information storing unit 101 and sends a timer activation request to the timer control unit 108, requesting the timer control unit 108 to activate the timer at the time set in the alarm data. The operation-mode control unit 103 refers to an alarm-mode switching time stored in the setting-information storing unit 101 and sends a timer activation request to the timer control unit 108, requesting the timer control unit 108 to activate the timer at the time set as the alarm-mode switching time.

When the cell phone 100 is in the alarm mode, upon receiving a notification from the key control unit 102 that there has been a key operation by the user to modify the alarm data sending period or the alarm-mode switching time, the operation-mode control unit 103 sends a timer activation request to the timer control unit 108, requesting the timer control unit 108 to activate the timer at the new time.

When the cell phone 100 is in the alarm mode, upon receiving a timeout notification of alarm data sending period from the timer control unit 108, the operation-mode control unit 103 instructs the GPS control unit 104 to get location data, the imaging-device control unit 105 to capture images, and the tone/audio control unit 106 to record the sounds, so that security data required for ascertaining the surroundings and location of the cell phone 100 can be obtained. Once the instructions are carried out, the operation made control unit 103 gets the information pertaining to alarm data destination stored in the setting-information storing unit 101, and based on the information, sends to the mail control unit 111 a request to send e-mail.

The operation-mode control unit 103 also sends an instruction to the mail control unit 111 to send e-mail when, in the alarm mode, the operation-mode control unit 103 receives a notification from the key control unit 102 that there has been a key operation by the user to send alarm data.

When the cell phone 100 is in the alarm mode, upon receiving a notification from the key control unit 102 that there has been a key operation by the user to sound an alarm, the operation-mode control unit 103 instructs the tone/audio control unit 106 to sound an alarm.

When the cell phone 100 is in the alarm mode, upon receiving a timeout notification of the emergency mode switching time from the timer control unit 108, the operation-mode control unit 103 switches the operation mode to the emergency mode. This feature is provided taking into consideration the possibility that the user of the cell phone 100 who is in a perilous situation may not be in a position to operate the cell phone 100.

The operation-mode control unit 103 also switches the operation mode to the emergency mode when, in the alarm mode, the operation-mode control unit 103 receives a notification from the battery-level control unit 109 that the battery level has fallen below the battery-level threshold value stored in the setting-information storing unit 101. This feature is provided to avoid a failure of the security function during an emergency due to battery shutoff.

The operation-mode control unit 103 also switches the operation mode to the emergency mode when, in the alarm mode, the operation-mode control unit 103 receives a notification from the key control unit 102 that the power has been switched off. This feature is provided taking into consideration the possibility that the cell phone 100 of the user has been confiscated and switched off by the perpetrator.

Once the operation mode of the cell phone 100 is switched to the emergency mode, the operation-mode control unit 103 refers to the value set for the power-on period stored in the setting-information storing unit 101 and sets the value on the always-powered-on clock chip 100*a* and then cuts off the power to the cell phone 100. In power-off condition, all the control units are shut down as if in the normal mode. Thus, only the clock chip 100*a* is on. When the power-on period set using the operation-mode control unit 103 has elapsed, the clock chip 100*a* powers on the application chip 100*b*.

When the clock chip 100*a* powers on the application chip 100*b* in the emergency mode, the operation-mode control unit 103 sends an emergency-mode activation request to the GPS control unit 104, the imaging-device control unit 105, the tone/audio control unit 106, the display control unit 107, the mail control unit 111, the wireless control unit 112, and the setting-information control unit 113.

When the cell phone 100 is in the emergency mode, the operation-mode control unit 103 instructs the GPS control unit 104 to get location data, the imaging-device control unit 105 to capture images, and the tone/audio control unit 106 to record the sounds, so that security data required for ascertaining the surroundings and location of the cell phone 100 can be obtained. Once the instructions are carried out, the operation made control unit 103 gets the information pertaining to the emergency data destination stored in the setting-information storing unit 101, and based on the information, sends to the mail control unit 111 a request to send e-mail.

Once the e-mail is sent, the operation-mode control unit 103 refers to the value set for power-on period stored in the setting-information storing unit 101 and sets the value on the clock chip 100*a*. The operation-mode control unit 103 then cuts off the power to the application chip 100*b*. The activity in the emergency mode is repeated periodically at user-specified intervals.

In the emergency mode, the operation-mode control unit 103 instructs the display control unit 107 to show no movement on the display and the tone/audio control unit 106 to mute all sounds.

When the cell phone 100 is in the alarm mode, upon receiving a notification from the key control unit 102 that there has been a key operation by the user to switch from the alarm mode to the normal mode, the operation-mode control unit 103 sends a request to the timer control unit 108 to stop the timer for alarm data sending period and the alarm-mode switching time and switches the operation mode from the alarm mode to the normal mode.

The operation-mode control unit 103 also sends a request to the timer control unit 108 to stop the timer for alarm data sending period and the alarm-mode switching time and switches the operation mode from the alarm mode to the normal mode when, in the alarm mode, the operation-mode control unit 103 receives a notification from the schedule control unit 110 that operation mode is to be switched to the normal mode.

When the operation mode is switched from the alarm mode to the normal mode, if an operation mode switching schedule is set, the operation-mode control unit 103 gets the time at which the operation mode is to be switched back to the alarm mode from the schedule control unit 110, and instructs the timer control unit 108 to start the timer at the time the operation-mode control unit 103 gets the time from the schedule control unit 110.

When the cell phone 100 is in the normal mode, upon receiving a timeout notification of the alarm-mode switching time from the timer control unit 108, the operation-mode control unit 103 switches the operation mode to the alarm mode.

Thus, by controlling the switching of the operation modes of the cell phone 100 based on the current operation mode of the cell phone 100, key operation notification from the key control unit 102, and the settings stored in the setting-information storing unit 101, the operation-mode control unit 103 controls the dispatch of security data at predetermined intervals to a predetermined destination in the alarm mode as well as the emergency mode.

The GPS control unit 104 gets location data by means of global positioning system (GPS) and manages the obtained location data. Upon receiving an instruction to get location data from the operation-mode control unit 103, the GPS control unit 104 promptly gets the location data and notifies the obtained location data to the operation-mode control unit 103.

The imaging-device control unit 105 captures images by means of a built-in imaging device the cell phone 100 and manages the image data. Upon receiving an instruction to capture image from the operation-mode control unit 103,.the imaging-device control unit 105 promptly captures images and notifies the image data to the operation-mode control unit 103.

The tone/audio control unit 106 controls the tone output and audio input. Upon receiving an instruction to record the sounds from the operation-mode control unit 103, the tone/audio control unit 106 promptly captures the sounds, and notifies the captured sounds to the operation-mode control unit 103. In the emergency mode, the tone/audio control unit 106 exerts control so as to output no tones.

The display control unit 107 controls what is displayed on the screen of the cell phone 100. In the emergency mode, the display control unit 107 exerts control so as to display nothing on the screen.

The timer control unit 108 controls counting of the regular intervals at which the image data/location data is dispatched in the alarm mode and the time remaining for switching the operation mode. The timer control unit 108 starts the timer at the specified time and notifies the operation-mode control unit 103 when timeout occurs.

The battery-level control unit 109 determines at regular intervals whether the battery level has fallen below the threshold value stored in the setting-information storing unit 101. If the battery level is found to be below the threshold value, the battery-level control unit 109 notifies it to the operation-mode control unit 103.

The schedule control unit 110 manages the schedule for switching between operation modes, and determines at regular intervals whether it is time to switch the operation mode from the normal mode to the alarm mode or vice versa based on the operation mode switching schedule stored in the setting-information storing unit 101. When the time set by the user arrives, the schedule control unit 110 sends a mode switch request to the operation-mode control unit 103.

The schedule control unit 110 only allows switching of the operation mode from the normal mode to the alarm mode and from the alarm mode and does not allow switching from the normal mode/the alarm mode to the emergency mode and vice versa.

The mail control unit 111 controls sending and receiving mail by receiving the security data and destination data from the operation-mode control unit 103 and sending the security data to the destination in the form of e-mail via the wireless control unit 112.

The wireless control unit 112 controls the sending and receiving of data, and receives data wirelessly and sends the received data wirelessly.

The setting-information control unit 113 receives the settings from the key control unit 102 and stores the received settings in the setting-information storing unit 101 or modifies the existing settings stored in the setting-information storing unit 101. Some examples of settings are power-on period, alarm data sending period, the emergency mode switching time, battery-level threshold value, alarm data destination, emergency data destination, operation mode switching schedule, etc. If any modification is made in the alarm data sending period or the emergency mode switching time, the setting-information control unit 113 notifies the modification to the operation-mode control unit 103.

Figure 3:
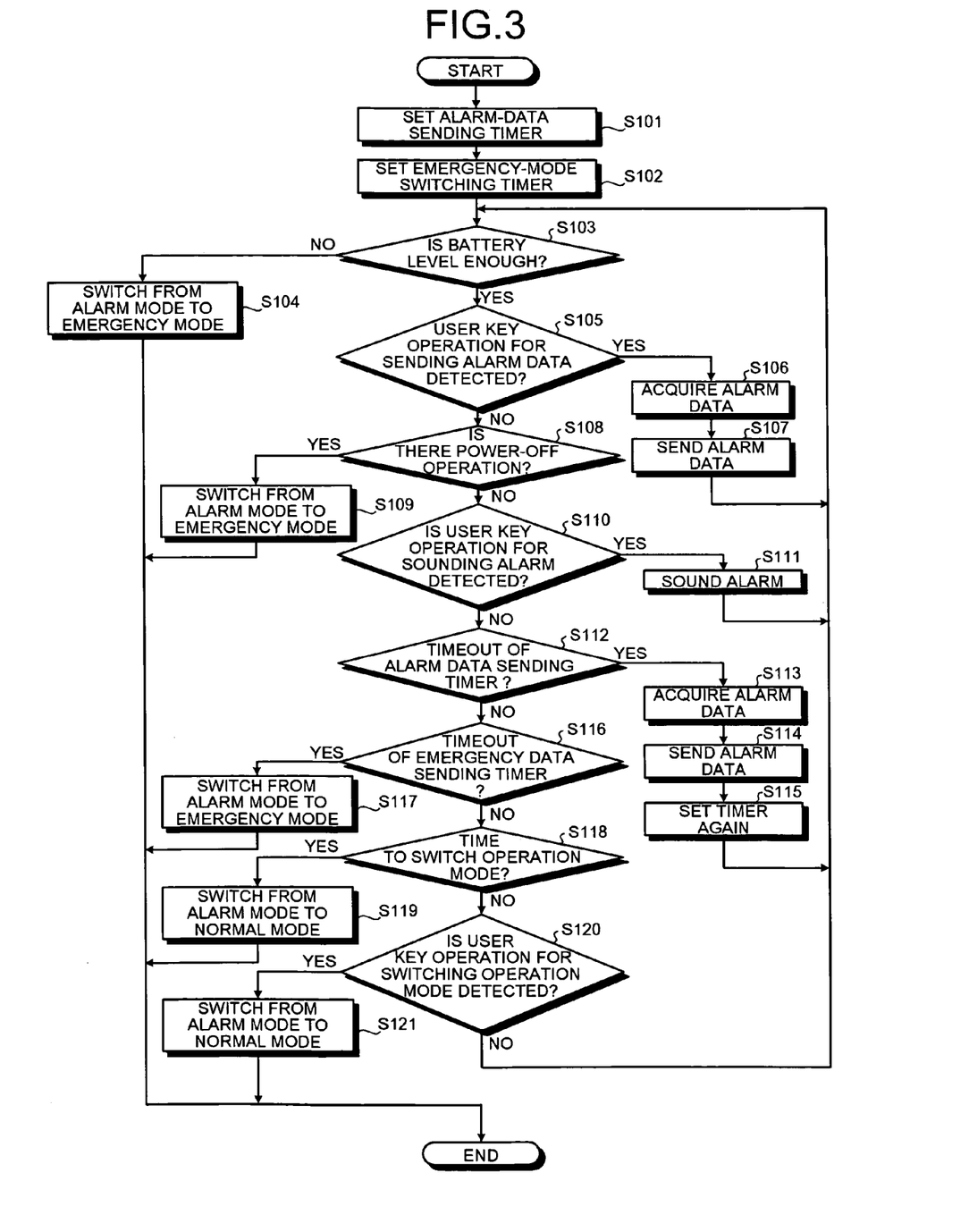
FIG. 3 is a flowchart of a processing procedure for an operation of the cell phone according to the present embodiment in an alarm mode.

FIG. 3 is a flowchart of a processing procedure for an operation of the cell phone according to the present embodiment in the alarm mode.

When the cell phone 100 is switched from the normal mode to the alarm mode, the operation-mode control unit 103 instructs the timer control unit 108 to set the alarm data sending timer required for counting down the alarm data sending period, and the timer control unit 108 sets the alarm data sending timer (step S101).

The operation-mode control unit 103 instructs the timer control unit 108 to set the emergency mode switching timer required for counting down to the emergency mode switching time, and the timer control unit 108 sets the emergency mode switching timer (step S102).

The battery-level control unit 109 compares the battery level and the battery-level threshold value, and determines that the battery power has dropped (step S103), notifies the fact to the operation-mode control unit 103. The operation-mode control unit 103 then switches the operation mode from the alarm mode to the emergency mode (step S104).

Upon receiving a key operation by the user to send alarm data (step S105), the key control unit 102 notifies the fact to the operation-mode control unit 103. The operation-mode control unit 103 receives the alarm data as security data (step S106), and notifies the mail control unit 111 to dispatch the received alarm data and the mail control unit 111 sends the alarm data in the form of e-mail via the wireless control unit 112 (step S107).

Upon receiving a power-off operation (step S108), the key control unit 102 notifies the fact to the operation-mode control unit 103. The operation-mode control unit 103 switches the operation mode from the alarm mode to the emergency mode (step S109).

Upon receiving a key operation by the user to sound an alarm (step S110), the key control unit 102 notifies the fact to the operation-mode control unit 103. The operation-mode control unit 103 instructs the tone/audio control unit 106 to sound an alarm and the tone/audio control unit 106 sounds the alarm (step S111).

Upon receiving a timeout notification of alarm data sending timer from the timer control unit 108 (step S112), the operation-mode control unit 103 gets the alarm data as security data (step S113). The operation-mode control unit 103 then instructs the mail control unit 111 to send alarm data and the mail control unit 111 sends the alarm data in the form of e-mail via the wireless control unit 112 (step S114).

The operation-mode control unit 103 instructs the timer control unit 108 to set another value for alarm data sending period (step S115).

Upon receiving a timeout notification of the alarm-mode switching timer (step S116), the operation-mode control unit 103 switches the operation mode from the alarm mode to the emergency mode (step S117).

If the schedule control unit 110 determines that it is time to switch the operation mode (step S118), the schedule control unit 110 notifies the fact to the operation-mode control unit 103. The operation-mode control unit 103 then switches the operation mode from the alarm mode to the normal mode (step S119).

Upon receiving a key operation by the user to switch operation modes (step S120), the key control unit 102 notifies the fact to the operation-mode control unit 103. The operation-mode control unit 103 switches the operation mode from the alarm mode to the normal mode (step S121).

Thus, if the user keeps the cell phone 100 in the alarm mode in advance, the operation-mode control unit 103 sends alarm data at regular intervals to a predetermined destination even if the user is not in a position to operate the cell phone 100 due to an emergency situation. Furthermore, setting the alarm-mode switching time enables the cell phone 100 to switch from the alarm mode to the emergency mode.

Figure 4:
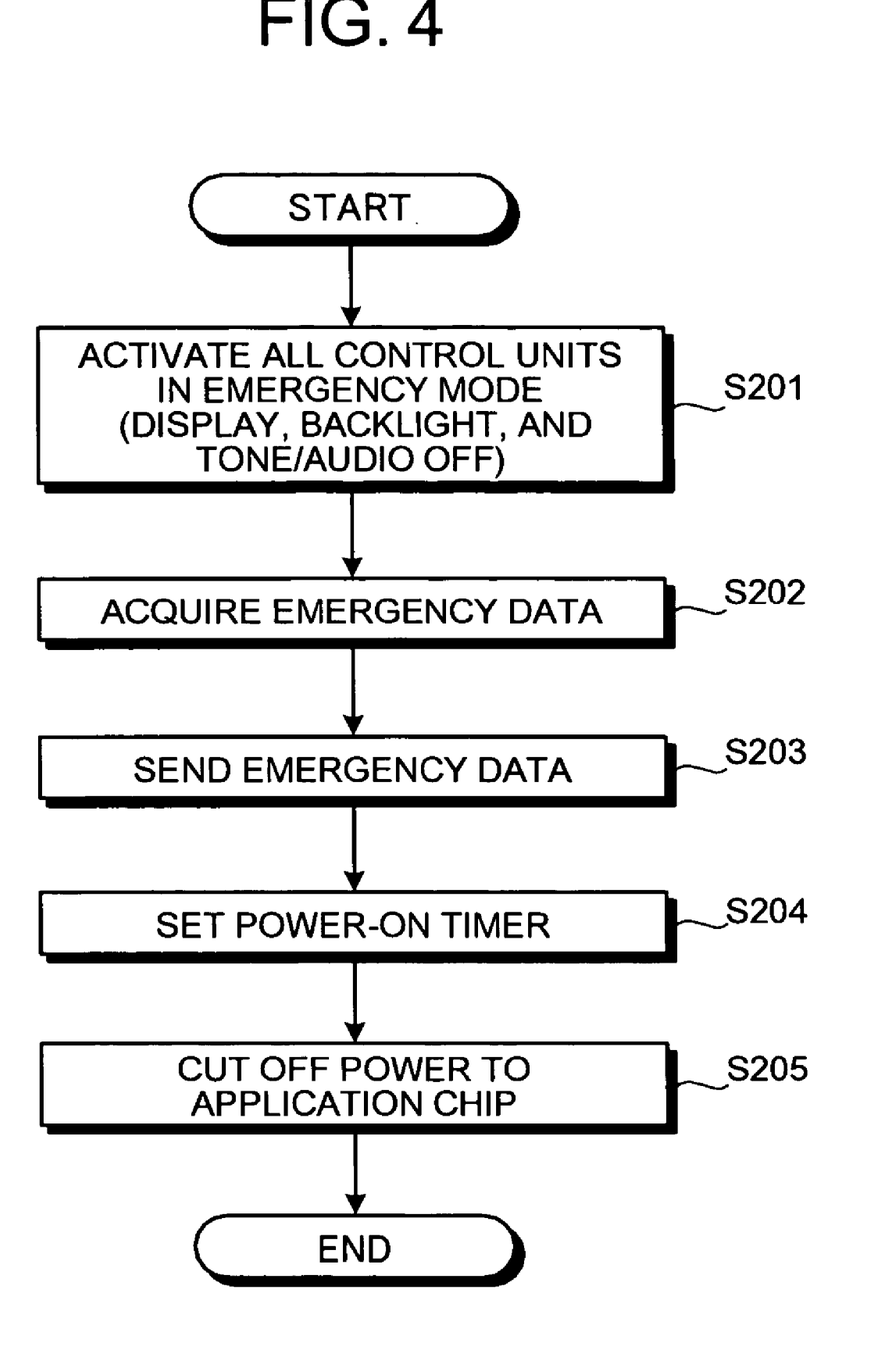
FIG. 4 is a flowchart of a processing procedure for the operation of the cell phone according to the present embodiment in an emergency mode.

FIG. 4 is a flowchart of a processing procedure for the operation of the cell phone according to the present embodiment in the emergency mode.

When the clock chip 100a of the cell phone 100 powers on the application chip 100b, the operation-mode control unit 103 activates the GPS control unit 104, the imaging-device control unit 105, the tone/audio control unit 106, the display control unit 107, the mail control unit 111, the wireless control unit 112, and the setting-information control unit 113 in the emergency mode (step S201). The operation-mode control unit 103 however instructs the responsible control units to show no display, switch off backlight, and mute tone/audio.

The operation-mode control unit 103 gets emergency data as security data (step S202) and instructs the mail control unit 111 to send the emergency data. The mail control unit 111 sends the emergency data via the wireless control unit 112 in the form of e-mail (step S203).

The operation-mode control unit 103 instructs the clock chip 100a to set a power-on timer and the clock chip 100a sets the power-on timer (step S204). The operation-mode control unit 103 then cuts off the power to the application chip 100b (Step S205).

Thus, if the user sets in advance a period after the lapse of which the cell phone 100 to switch from the alarm mode to the emergency mode, in the emergency mode, the operation-mode control unit 103 sends the emergency data at regular intervals to a predetermined destination in the power-on duration even if the user is not in a position to operate the cell phone 100 due to an emergency situation.

To sum up, the cell phone 100 according to the present embodiment has a the alarm mode in which the operation-mode control unit 103 exerts control so as to send to a predetermined destination alarm data at predetermined intervals. Consequently, security function of the cell phone 100 is activated even if the user is unable to operate the cell phone 100, which is expected in an emergency situation.

In the cell phone 100 according to the present embodiment, the operation-mode control unit 103 switches the operation mode from the alarm mode to the emergency mode if the power is switched off when the cell phone 100 is in the alarm mode, or if the battery level falls below a predetermined threshold value, or when a predetermined period has elapsed in the alarm mode. In the emergency mode, the operation-mode control unit 103 controls the responsible control units so as to send to a predetermined destination the emergency data with the display and tones of the cell phone 100 switched off.

In other words, if the cell phone 100 is kept in the alarm mode, even if the user is unexpectedly caught in a perilous situation such as abduction or illegal incarceration, the cell phone 100 automatically switches from the alarm mode to the emergency mode after the lapse of a predetermined period preset by the user and carries out the security functions in the emergency mode. Thus security data such as location data, images, and audio data of the scene of crime can be dispatched without alerting the perpetrator.

Furthermore, even in the event of the perpetrator confiscating and switching off the cell phone 100, the cell phone 100 activates the emergency mode and the security functions thereof. Consequently, by increasing the probability of pinpointing the location of the scene of crime, damage to the user can be prevented.

The cell phone 100 according to the present embodiment in addition to having all the functions of a regular cell phone can also function as a security device by easy operation. When in a potentially dangerous situation such as when in a deserted place, or an unsafe zone, or when returning late at night, the user can easily switch the operation mode to vigilance or the emergency mode, activating the security functions of the cell phone 100.

Apart from a cell phone, which is described as a portable wireless terminal in the present embodiment, the present invention can be adapted to any portable wireless device that can communicate wirelessly may be used.

Apart from security against crime, which is described here, the present invention may be adapted for any emergency situation where the user is unable to operate the device, such as during an accident, or a medical emergency.

According to the present invention, it is possible to provide a security to a user.

Furthermore, according to the present invention, it is possible to provide a security to the user in an emergency situation.

Moreover, according to the present invention, it is possible to switch to an alarm mode in advance in a situation in which the alarm mode is required.

Furthermore, according to the present invention, it is possible to prevent failing to set the operation mode to the alarm mode by setting a schedule.

Although the invention has been described-with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A portable wireless terminal apparatus comprising:
an operation-mode control unit to control switching of an operation mode of the portable wireless terminal between a normal mode and an alarm mode, and switching of the operation mode to an emergency mode when a condition is satisfied in the alarm mode, the condition being a switch-off of the portable wireless terminal apparatus;
an alarm-data sending unit to send data pertaining to a situation of a user to a destination as alarm data, when the operation mode is switched to the alarm mode; and
an emergency-data sending unit to send data pertaining to the situation of the user to the destination as emergency data by turning the portable wireless terminal apparatus on if the portable wireless terminal is in a powered-off state when the operation mode is switched to the emergency mode, wherein
in the normal mode, the portable wireless terminal apparatus performs normal functions as a portable wireless communication terminal,
in the alarm mode, the portable wireless terminal apparatus performs a user protecting function that includes sending the alarm data in addition to the normal functions, and
in the emergency mode, the user protecting function is activated even if the portable wireless terminal apparatus is in a powered-off state.

2. The portable wireless terminal apparatus according to claim 1, wherein
the alarm-data sending unit sends the alarm data to the destination at regular intervals.

3. The portable wireless terminal apparatus according to claim 1, wherein
the operation-mode control unit turns on the portable wireless terminal apparatus if the portable wireless terminal is in the emergency mode, but in a powered-off state.

4. The portable wireless terminal apparatus according to claim 1, wherein
the emergency-data sending unit sends the emergency data to the destination at regular intervals.

5. The portable wireless terminal apparatus according to claim 1, further comprising:
a display; and
sound devices, wherein
the display and sound devices have the appearance of being off when the emergency-data sending unit sends the emergency data to the destination.

6. The portable wireless terminal apparatus according to claim 1, wherein
the operation-mode control unit controls the switching of the operation mode based on a key operation by the user.

7. The portable wireless terminal apparatus according to claim 1, wherein
the operation-mode control unit controls the switching of the operation mode based on a schedule.

8. The portable wireless terminal apparatus according to claim 1, wherein the alarm data and the emergency data include location information acquired using a global positioning system.

9. The portable wireless terminal apparatus according to claim 1, wherein operation-mode control unit controls switching the operation mode of the portable wireless terminal from the alarm mode to the emergency mode without user input.

10. A method of securing a safety of a user of a portable wireless terminal apparatus, the method comprising:
controlling switching of an operation mode of a portable wireless terminal between a normal mode and an alarm mode and switching the operation mode of the portable wireless terminal between the alarm mode and the emergency mode; and
sending data pertaining to a situation of a user to a destination as alarm data when the operation mode is switched to the alarm mode, and as emergency data when the operation mode is switched to the emergency mode, wherein
in the normal mode, the portable wireless terminal apparatus performs normal functions as a portable wireless communication terminal,
in the alarm mode, the portable wireless terminal apparatus performs a user protecting function that includes sending the alarm data in addition to the normal functions,
in the emergency mode, the user protecting function is activated even if the portable wireless terminal apparatus is in a powered-off state, and
in the alarm mode, the controlling includes switching the operation mode to the emergency mode when a condition is satisfied, the condition being a switch-off of the portable wireless terminal apparatus.

11. The method according to claim 10, wherein the sending sends the alarm data to the destination at regular intervals.

12. The method according to claim 10, further comprising:
turning the portable wireless terminal apparatus on if the portable wireless terminal is in the emergency mode, but in a powered-off state.

13. The method according to claim 10, wherein the sending sends the emergency data to the destination at regular intervals.

14. The method according to claim 10, wherein the sending sends the emergency data to the destination while a display and sound devices of the portable wireless terminal apparatus have the appearance of being off.

15. The method according to claim 10, wherein the controlling controls the switching of the operation mode based on a key operation by the user.

16. The method according to claim 10, wherein the controlling controls the switching of the operation mode based on a schedule.

17. The method according to claim 10, wherein the alarm data and the emergency data include location information acquired using a global positioning system.

18. A non-transitory computer-readable recording medium that stores therein a computer program for securing a safety of a user of a portable wireless terminal apparatus, wherein the computer program causes a computer to execute:
controlling switching of an operation mode of a portable wireless terminal between a normal mode and an alarm mode and switching of the operation mode of the portable wireless terminal between the alarm mode and the emergency mode; and
sending data pertaining to a situation of a user to a destination as alarm data when the operation mode is switched to the alarm mode and as emergency data when the operation mode is switched to the emergency data mode, wherein
in the normal mode, the portable wireless terminal apparatus performs normal functions as a portable wireless communication terminal,
in the alarm mode, the portable wireless terminal apparatus performs a user protecting function that includes sending the alarm data in addition to the normal functions,
in the emergency mode, the user protecting function is activated even if the portable wireless terminal is in a powered-off state, and
in the alarm mode, the controlling includes switching the operation mode to the emergency mode when a condition is satisfied, the condition being a switch-off of the portable wireless terminal apparatus.

* * * * *